United States Patent [19]

Fisher, II et al.

[11] Patent Number: 5,799,238
[45] Date of Patent: Aug. 25, 1998

[54] METHOD OF MAKING MULTILAYERED TITANIUM CERAMIC COMPOSITES

[75] Inventors: George T. Fisher, II, Shedd; Jeffrey S. Hansen, Corvallis; Laurance L. Oden, Albany; Paul C. Turner, Albany; Thomas L. Ochs, Albany, all of Oreg.

[73] Assignee: The United States of America as represented by the United States Department of Energy, Washington, D.C.

[21] Appl. No.: 490,262

[22] Filed: Jun. 14, 1995

[51] Int. Cl.$^6$ ........................................... B22K 7/02
[52] U.S. Cl. .......................... 419/7; 419/13; 419/14; 419/17; 419/28; 419/29; 419/48; 419/50; 419/54; 419/55
[58] Field of Search .................. 419/10, 12, 13, 419/14, 7, 17, 28, 29, 48, 50, 54, 55

[56] References Cited

U.S. PATENT DOCUMENTS

| | | |
|---|---|---|
| 4,699,849 | 10/1987 | Das ................................. 428/698 |
| 4,731,115 | 3/1988 | Abkowitz et al. ................. 75/236 |
| 4,797,155 | 1/1989 | Das ................................. 75/229 |
| 4,805,833 | 2/1989 | Seimers ........................... 228/190 |
| 4,909,842 | 3/1990 | Dunmead et al. ............... 75/236 |
| 5,149,595 | 9/1992 | Kojo et al. ....................... 428/552 |
| 5,256,368 | 10/1993 | Oden et al. ...................... 419/10 |
| 5,364,442 | 11/1994 | Sekhar ............................ 75/229 |
| 5,384,087 | 1/1995 | Scorey ............................ 419/10 |
| 5,508,115 | 4/1996 | Linsey et al. ................... 428/549 |

*Primary Examiner*—Daniel J. Jenkins
*Attorney, Agent, or Firm*—Mark LaMarre; Mark P. Dvorscak; William R. Moser

[57] ABSTRACT

A method making a titanium ceramic composite involves forming a hot pressed powder body having a microstructure comprising at least one titanium metal or alloy layer and at least one ceramic particulate reinforced titanium metal or alloy layer and hot forging the hot pressed body follwed by hot rolling to substantially reduce a thickness dimension and substantially increase a lateral dimension thereof to form a composite plate or sheet that retains in the microstructure at least one titanium based layer and at least one ceramic reinforced titanium based layer in the thickness direction of the composite plate or sheet.

14 Claims, 2 Drawing Sheets

METHOD OF MAKING MULTILAYERED TITANIUM CERAMIC COMPOSITES

BACKGROUND OF THE INVENTION

1. Field of the Invention

The present invention relates to manufacture of titanium ceramic composites that are hot worked to plate or sheet form and retain a multilayered composite microstructure comprising one or more titanium-based layers and one or more ceramic particulate reinforced titanium based layers.

2. Background of the Invention

The preparation of multilayered or laminated titanium ceramic composites as potential structural materials having high strength and stiffness as well as wear resistance with, however, limited ductility is described in U.S. Pat. No. 5,256,368. Pursuant to the method described in the patent, alternating layers of titanium alloy powders and titanium alloy powders mixed with ceramic reinforcement powder, such as boron carbide powder, are arranged in a graphite die and then hot pressed in the die under elevated temperature and pressure conditions to form a fully densified, hot pressed body having a microstructure comprising alternating layers of Ti-based alloy and ceramic particulate reinforced Ti alloy layers in alternating sequence. Although the one step pressure-reaction synthesis process described in this patent produces a titanium ceramic composite body, the size of the composite body capable of being produced has been limited by the size of the graphite die in which the aforementioned alternating layers are hot pressed. The method is unable to produce thin, multilayered or laminated composite bodies in the form of plate or sheet having one or more lateral dimensions substantially greater than the lateral dimension of the die. Such plate or sheet titanium ceramic composites would be desirable as a light weight structural material for use in the aerospace, automotive, and ordinance (armor) industries to save weight and energy.

The fabrication of titanium carbide/titanium alloy composites also is described in U.S. Pat. No. 4,731,115 which involves a complex, multi-step method wherein alternating layers of titanium alloy powders and titanium alloy powders mixed with TiC reinforcement powder as a microcomposite powder initially are cold pressed in a graphite die at elevated pressure to form a cold pressed compact or body having a microstructure comprising alternating layers of titanium alloy and TiC particulate reinforced titanium alloy layers in alternating sequence. The cold pressed compact then is sintered at high temperature, and the sintered compact is encased in a suitable gas impermeable layer or envelope and hot isostatically pressed at elevated temperature and gas pressure to obtain a fully dense, consolidated multilayered titanium ceramic composite body. However, this fabrication method is complex, involving multiple, costly processing steps, such as cold isostatic pressing, sintering, and hot isostatic pressing. Moreover, this fabrication method is unable to produce thin, multilayered or laminated composite bodies in the form of plate or sheet having one or more lateral dimensions substantially greater than the lateral dimension of the die.

There is need to provide a method of making multilayered or laminated titanium ceramic composites in a manner to form titanium ceramic composite plate or sheet that can be used as a structural plate or sheet material in the aerospace, automotive, ordinance and other fields where a light weight, high strength composite material is desired.

Further, there is a need for a method of making multilayered or laminated titanium ceramic composites in the form of plate or sheet that exhibits a laminated microstructure comprising one or more layers of Ti based material and one or more layers of ceramic particulate reinforced Ti based layers in alternating or graded manner in the thickness direction of the composite plate or sheet.

SUMMARY OF THE INVENTION

An object of the present invention is to provide a method for making a multilayered titanium ceramic composite wherein a hot pressed titanium ceramic body is thermomechanically processed by hot working of composite plate or sheet heretofore unavailable from the prior art.

Another object of the present invention is to provide a method of making titanium ceramic composite plate or sheet by thermomechanical processing in a manner that the plate or sheet microstructure exhibits a laminated structure comprising one or more titanium based layers and one or more ceramic particulate reinforced titanium based layers in alternating or graded manner in the thickness direction of the composite plate or sheet.

These and other objects of the present invention are achieved by forming a hot pressed composite body having a laminated microstructure comprising at least one titanium based layer and at least one ceramic particulate reinforced titanium based layer and then hot working the hot pressed body in sequential stages by hot forging followed by hot rolling to an extent to form a titanium composite plate or sheet having a substantially reduced thickness dimension and at least one substantially reduced lateral dimension as compared to the hot pressed body. The hot worked titanium composite plate or sheet is formed under hot forging and hot rolling conditions that retain a laminated microstructure comprising at least one titanium based layer and at least one ceramic particulate reinforced titanium based layer through the thickness of the composite plate or sheet. A plurality of distinct titanium based layers and ceramic particulate reinforced layers can be provided in the thickness direction of the composite plate or sheet. Alternately, a compositionally graded region can be provided in the composite plate or sheet between the titanium based layer (devoid of ceramic particulate reinforcement) and the ceramic particulate reinforced titanium based layer. In the graded region, the amount of ceramic particulates can progressively increase from the titanium based layer devoid of ceramic reinforcement particulates to the ceramic particulates reinforced layer.

The objects and advantages of the present invention will become more readily apparent from the following detailed description of the invention taken with the following drawings.

DETAILED DESCRIPTION OF THE INVENTION

Figure 1:
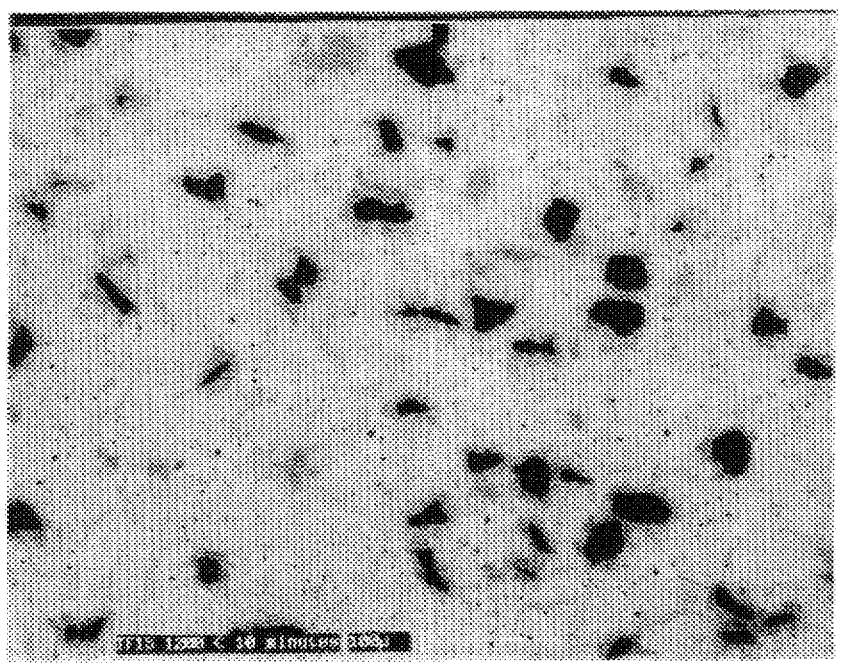
FIG. 1 is a scanning electron micrograph at 200× of boron carbide reinforcement particles in an unalloyed titanium metal matrix after hot pressing at 1200 degrees C. at 3000 psi for a total of 20 minutes in an argon atmosphere.

In practicing an embodiment of the present invention, a hot pressed multilayered or laminated composite body or compact having a microstructure comprising at least one titanium based layer and at least one ceramic particulate reinforced titanium based composite layer in the thickness direction is formed by known hot pressing techniques that achieve strong interfacial bonding between the ceramic reinforcement particulates and titanium based matrix of the composite layer. A preferred hot pressing technique to this end comprises the pressure-reaction synthesis (PRS) technique described in U.S. Pat. No. 5,256,368 issued Oct. 26, 1993, the teachings of which are incorporated herein by reference.

The pressure-reaction synthesis (PRS) mixture of powders (as discussed in the '368 patent) is a combination of materials selected to react exothermically or with a significant evolution of heat energy. The reaction or reactions may occur at positions of particle contact as in the case where one or more of the reactants are coarse particles, to produce high local temperatures that accelerate a solid-state diffusion and/or result in melting of one or more of the phases.

The reaction or reactions can also occur over an advancing reaction front, as in the case where reactants are fine powders, and result in extensive melting. The latter case is commonly called self-sustaining high-temperature combustion synthesis (SHS). It will be recognized by those skilled in the art that particle size and the gradation of particle sizes are critical to: the packing density; the green strength of the unreacted mixture of powders; the extent of the PRS reaction or reactions; and the reaction rate. Consolidation of the PRS material to near theoretical density occurs in a very short time (1 to 10 minutes), at low global temperature ranges (900° to 1300° C.), and under conditions of light external pressure in the range 6.9 to 34.5 MPA (1000 to 5000 psi). In the case of laminated composites or coated substrates, the PRS material is effectively bonded to the substrate.

Because of the lower temperature of the process and short residence time at this temperature, there is no significant degradation of the physico-chemical properties of the metal, alloy, cermet, or ceramic substrate. The requisite external pressure and temperature can advantageously be obtained by hot pressing, hot isostatic pressing, hot rolling, or other means known to anyone skilled in the art.

An appropriate PRS reaction for Ti and its alloys is given by equation 1 as follows:

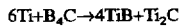

$$6Ti+B_4C \rightarrow 4TiB+Ti_2C$$

The formulae for the products of the PRS reaction approximate the actual compositions observed. It is understood that the invention is broad in scope and is appropriate to the formation of macs, coated substrates, and laminated composites for the other reactive metals (Zr, Hg and their alloys) and the refractory metals (Cr, Mo, W, V, Nb, Ta and their alloys). Effective fuel material include but are not limited to C, B, N, $B_4C$, BN, SiC, and $Si_3N_4$.

In practicing the present invention, the PRS technique can be conducted by hot pressing alternating layers of titanium based powder and composite powder comprising a mixture of titanium based powder and ceramic reinforcement powder in a graphite or other suitable hot pressing die. In lieu of providing a plurality of distinct titanium based powder layers and composite powder layers in alternating sequence in the hot pressing die, the invention envisions providing a graded powder region between a titanium based powder layer and composite powder layer where in the graded region, the amount of ceramic particulates changes from the titanium based powder layer devoid of ceramic particulate reinforcements to the composite layer reinforced with ceramic particulates to a given extent.

The powder layers are pressed under conditions of elevated temperature, elevated pressure, and time at temperature and pressure to provide controlled reaction synthesis between the ceramic reinforcement powder particles and the titanium based powder to form an interface layer typically comprising layers of titanium monoboride, titanium diboride, and titanium carbide. Such controlled reaction synthesis provides a strong interfacial bond between the ceramic reinforcement powder particles and the titanium based matrix to increase mechanical properties of the material.

The titanium based powder layers introduced into the hot pressing die may comprise titanium metal powder (e.g. commercially pure titanium metal powder), prealloyed titanium alloy powder, such as preferably Ti-6Al-4V, and mixtures of unalloyed titanium metal powder and powders of one or more other metals that will result in formation of a titanium alloy during the hot pressing process. Similarly, the ceramic reinforcement powder may comprise preformed ceramic powders such as including, but not limited to, $B_4C$, BN, SiC and $Si_3N_4$, and mixtures of elemental powders (e.g. B and C) in proper proportions to form ceramic reinforcement particles during hot pressing.

For purposes of illustration and not limitation, a particular embodiment of the invention involves introducing into the hot pressing die a plurality of titanium metal powder layers and a plurality of composite powder layers in alternating sequence with the composite powder layers each comprising a mixture of titanium metal powder and boron carbide ($B_4C$) powder. The titanium metal powder can be in the size range of about 1 to about 44 microns in diameter. The boron carbide powder can be in the size range of about 1 to 500 microns in diameter. The titanium metal powder and the boron carbide powder are mixed together to form the aforementioned composite powder having boron carbide in an amount from about 5 to about 15 weight % of the composite powder.

The alternating powder layers are hot pressed in the graphite die under temperature, pressure and time at temperature and pressure conditions to form a consolidated body or compact having a multi-layered or laminated structure comprising the alternating titanium based layers (e.g. titanium metal or alloy) and ceramic particulate reinforced titanium based layers (e.g. ceramic particulate reinforced titanium metal or alloy). In the practice of the invention, pressing temperatures in the range of about 900 degrees C. to about 1300 degrees C. can be used in combination with pressing pressures in the range of about 1000 psi to about 6000 psi at pressing times in the range of 1 to 60 minutes. These hot pressing parameters typically are effective within the context of the invention described hereabove to achieve pressure-reaction synthesis between the ceramic reinforcement powder particles and the surrounding titanium based matrix to provide strong interfacial bonding therebetween and a hot pressed microstructure comprising at least one titanium based layer and at least one ceramic particulate reinforced titanium based composite layer.

The hot pressed body or compact then is thermomechanically worked by hot forging followed by hot rolling in a manner to form a plate or sheet product that is relatively thin as compared to the thickness of the hot pressed body or compact and that has at least one lateral dimension (e.g. plate or sheet length and/or width) substantially enlarged as compared to a lateral dimension of the hot pressing die (e.g. the diameter of the hot pressing die cavity). A composite plate product in the context of the invention has a thickness of 0.1875 inch and greater up to 4 inches, while a composite sheet product has thickness less than 0.1875 inch. The conditions of hot forging and hot rolling are controlled to hot work the hot pressed multi-layered, laminated body or compact to plate or sheet dimensions while retaining the multi-layered, laminated microstructure comprising at least one titanium based layer and at least one ceramic particulate reinforced titanium based composite layer in the plate or sheet thickness direction.

The hot pressed body or compact preferably is upset forged in staged reductions at a suitable elevated forging temperature with an annealing heat treatment provided between reductions and then hot rolled at elevated rolling temperature in multiple passes or staged reductions with an annealing treatment provided between rolling passes. The forging and rolling temperatures, reductions, and annealing temperature and times will depend upon the composition of the titanium based layers employed and can be selected accordingly.

For purposes of illustration and not limitation, a hot pressed multi-layered, laminated body or compact comparising titanium metal layers and ceramic reinforced titanium metal layers in alternating sequence can be upset forged at forging temperatures in the range of about 1600 degrees F. to about 1700 degrees F. and rolled at rolling temperatures in the range of about 1400 degrees F. to about 1450 degrees F. when rolling plate and in the range of about 1300 degrees F. to about 1400 degrees F. when rolling sheet. Time at elevated forging and rolling temperature should be minimized to reduce oxidation and grain growth of the titanium matrix layer material. These hot forging and hot rolling parameters are effective in the context of the invention to produce titanium composite plate and sheet while retaining the multi-layered, laminated microstructure comprising a plurality of titanium metal layers and a plurality of ceramic particulate reinforced titanium composite layers in alternating sequence in the thickness direction of the composite plate or sheet thickness.

The hot pressed body or compact can be coated or covered prior to hot forging and hot rolling with a barrier layer, such as a zirconium oxide forge coat (available as METAL-GUARD forge coat), that will help reduce oxidation of titanium during the aforementioned hot working steps. Any oxide scale layers and contaminated surface layers on the forged and rolled plate or sheet product should be removed mechanically or chemically by pickling, for example, prior to further processing.

Following hot forging and hot rolling, the multi-layered, laminated titanium composite plate or sheet product can be subjected to a final annealing heat treatment. In the event that the titanium based layers comprise a heat treatable titanium alloy, such as Ti-6Al-4V, the annealing temperature and time are selected to restore the strength level of the titanium alloy to a mill-annealed level. For purposes of illustration and not limitation, the annealing heat treatment can be conducted at 1000 degrees F. for 1 hour and up to 2 hours at 1300 degrees F., followed by air cooling, when Ti-6Al-4V alloy layers are present. On the other hand, unalloyed titanium metal layers in the hot forged/hot rolled composite plate or sheet are not heat treatable to improve strength.

The following Example for making titanium composite sheet is offered to illustrate the invention in greater detail and not to limit the invention.

EXAMPLE

Commercially pure, unalloyed titanium metal was employed for the titanium based layers and as the matrix for the composite layers including 5 weight % boron carbide (B C) ceramic reinforcement powder therein. The unalloyed titanium powder was less than 320 mesh size (i.e. −320 mesh), while the boron carbide powder was less than 320 mesh size (i.e. −320 mesh). The composite powder was made by blending 5 weight % of the boron carbide powder and the balance titanium metal powder in a tubular mixer for 2 hours to produce a uniform mixture of the powders.

A graphite hot pressing die having die cavity with a diameter of 2.5 inch diameter and length of 8 inches was then filled with alternating layers of the unalloyed titanium powder and the composite powder starting and ending with titanium powder layers such that two (2) composite layers were sandwiched between titanium powder layers on each side, providing a total of three (3) titanium powder layers and two (2) composite powder layers in the die cavity. Each powder layer was approximately 1.25 inches in thickness in the die cavity.

The powder filled graphite die then was placed in a conventional vacuum induction hot press and heated to 1200 degrees C. within 20 minutes under a die pressure of 3000 psi in an inert atmosphere of argon. The temperature and pressure were maintained for a holding period of 10 minutes. These hot pressing parameters were found to produce pressure-reaction synthesis between the boron carbide powder particles and unalloyed titanium matrix material to form an interface layer therebetween comprising layers of titanium monoboride, titanium diboride, and titanium carbide for strong interfacial bonding.

Figure 2:
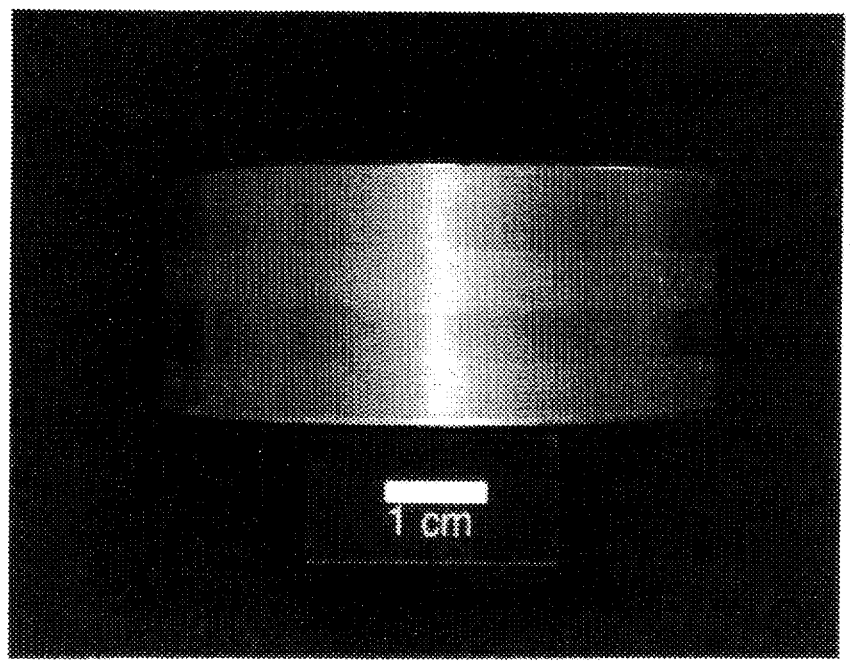
FIG. 2 is photograph of a hot pressed laminated titanium composite body wherein the dark bands comprise Ti layers and the light bands comprise boron carbide particle reinforced Ti metal layers.

FIG. 1 is a scanning electron micrograph at 200× of the boron carbide reinforcement particles in the unalloyed titanium matrix after hot pressing under these conditions. FIG. 2 is photograph of the hot pressed laminated titanium composite body produced wherein the three (3) dark bands comprise unalloyed titanium layers and the two (2) light bands comprise boron carbide particulate reinforced unalloyed titanium layers. The hot pressed body comprised five (5) layers each approximately 0.25 inch in thickness. The hot pressed body had a total thickness of about 1.25 inch and a diameter of about 2.5 inches.

The hot pressed body then was coated with the aforementioned zirconium oxide forge coat to a thickness of approximately 0.05 inch suitable to prevent oxidation of the titanium layer material during subsequent thermomechanical processing to sheet form.

The coated hot pressed body was thermomechanically processed by repeatedly heating the body to about 1650 degrees F. for 30 minutes followed by upset forging to achieve a 0.25 inch reduction in the thickness direction per forging strike or blow. That is, after each reduction in thickness, the body was reheated prior to the next reduction of 0.25 inch. The hot pressed body was upset forged in this manner to a final forged thickness of 0.50 inch as compared to the starting thickness of 1.25 inches for the hot pressed body. The forged body had an approximate diameter of 4.3 inches.

The forged body then was repeatedly heated to 1450 degrees F. for 10 minutes and rolled at a 20 percent reduction in the thickness direction per rolling pass. That is, after each rolling pass, the body was reheated prior to the next rolling pass. The forged body was hot rolled in this manner to a final sheet thickness of 0.13 inch with a cross-sectional area of 37.75 inches that was suitable for preparation of flat tensile specimens.

Figure 3:
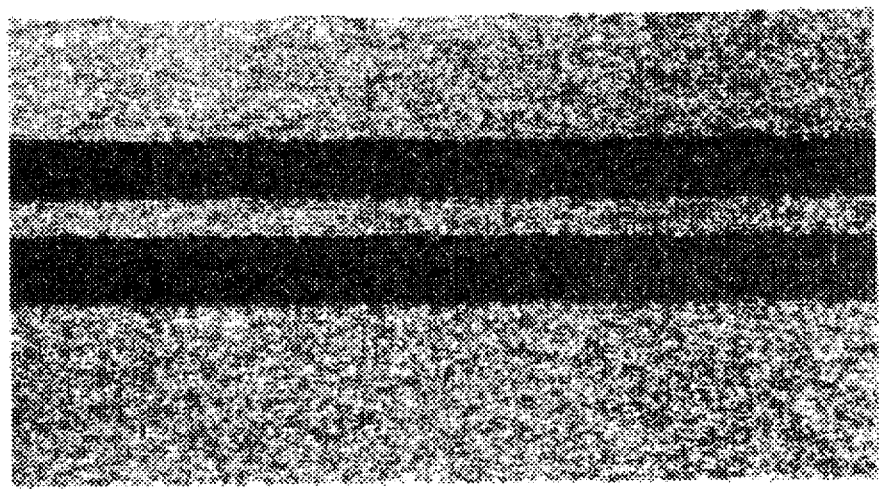
FIG. 3 is a photomicrograph at 4× of a transverse cross-section of microstructure of a hot forged and hot rolled laminated titanium ceramic composite sheet made pursuant to an embodiment of the invention wherein the dark bands comprise unalloyed titanium metal layers and the light bands comprise boron carbide particle reinforced titanium metal layers.

After the final hot rolling pass, the composite sheet product was annealed at 1000 degrees F. for 1 hour. FIG. 3 is a photomicrograph at 4× of the microstructure through the thickness of the laminated titanium ceramic composite sheet obtained after hot forging, hot rolling, and annealing in the manner described wherein the dark bands comprise unalloyed titanium layers and the light bands comprise boron carbide particulate reinforced unalloyed titanium layers. It is apparent that a laminated microstructure comprising alternating layers of unalloyed titanium and boron carbide reinforced titanium in the sheet thickness direction has been retained in the hot forged- hot rolled-annealed composites sheet.

The foregoing description of specific embodiments of the invention will so fully reveal the general nature of the invention that others can, by applying current knowledge, readily modify and/or adapt for various applications such specific embodiments without departing from the general concept, and therefore, such adaptations and modifications should and are intended to be comprehended within the meaning and range of equivalents of the disclosed embodiments. It is to be understood that the phraseology or terminology employed herein is for purpose of description and not of limitation.

What is claimed is:

1. A method making a multilayered, laminated metal ceramic composite plate or sheet, comprising:
   a) forming a hot pressed composite body having a microscrostructure comprising at least one metal-based layer and at least one ceramic particulate reinforced metal-based layer, wherein hot pressing comprises exothermically reacting a metal powder or metal powder allows with ceramic particulate of the ceramic particulate reinforced metal-based layer, where the ceramic particulate is selected from the group consisting of C, B, N, BN, $B_4C$, SiC, and $Si_3N_4$ at temperatures from about 900° to about 1300° C., for about 5 to about 30 minutes in a forming die under pressures of from about 1000 to 5000 psi;
   b) hot working the hot pressed body in a manner to substantially reduce a thickness dimension of said hot pressed body and to substantially increase a lateral dimension of said hot pressed body to form a composite plate or sheet having a microstructure including at least one metal-based layer and at least one ceramic reinforced metal-based layer in the thickness direction of said composite plate or sheet,
   where the metal is selected from the group consisting of titanium, zirconium, hafnium, chromium, molybdenum, tungsten, vanadium, niobium, and tantalum.

2. The method of claim 1 wherein the metal-based layer is a titanium-based layer and the ceramic particulate reinforced metal-based layer is titanium-based.

3. The method of claim 2 wherein the titanium based layer comprises unalloyed titanium metal or titanium alloy.

4. The method of claim 2 wherein the ceramic particulate reinforced titanium based layer comprises unalloyed titanium metal or titanium alloy reinforced with ceramic particulates selected from the group consisting of $B_4C$, BN, SiC, and $Si_3N_4$.

5. The method of claim 4 wherein the ceramic reinforcement particulates are present in an amount of about 5 to about 15 % by weight of said ceramic particulate reinforced titanium based layer.

6. The method of claim 1 wherein said hot pressed body is hot worked in step b) by forging and then hot rolling to form said composite plate or sheet.

7. The method of claim 6 wherein said hot pressed body is reduced by repeated forging reductions each followed by heating prior to the next forging reduction.

8. The method of claim 6 wherein said forged body is hot rolled by repeated rolling passes followed by heating prior to the next rolling pass.

9. The method of claim 1 further including annealing the hot worked composite plate or sheet.

10. A method making a multilayered, laminated titanium ceramic composite plate or sheet, comprising:
    a) disposing in a die at least one layer comprising titanium based particulates and at least one layer comprising a mixture of ceramic particulates and titanium based particulates,
    b) hot pressing said layers in said die to form a pressed composite body having a microstructure comprising at least one titanium based layer and at least one ceramic particulate reinforced titanium based layer,
    c) forging the hot pressed composite body at elevated temperature to reduce a thickness dimension and increase a lateral dimension thereof, and
    d) rolling the forged body at elevated temperature to further reduce a thickness dimension and further increase a lateral dimension thereof to form a composite plate or sheet having at least one titanium based layer and at least one ceramic reinforced titanium based layer in the thickness direction of said composite plate or sheet.

11. The method of claim 10 wherein a plurality of layers comprising said titanium based particulates and a plurality of layers comprising said mixture are arranged as distinct layers in alternating sequence in said die.

12. The method of claim 10 wherein a graded region is provided between said one layer comprising said titanium based particulates and said one layer comprising said mixture, said graded region having ceramic reinforcement particulates in an amount that changes between said one layers.

13. The method of claim 10 wherein the ceramic particulates are selected from the group consisting of $B_4C$, BN, SiC, and $Si_3N_4$.

14. The method of claim 10 wherein the titanium based particulates comprise titanium metal powder, titanium alloy powder, or titanium metal powder in combination with at least one other metallic powder in an amount to form a titanium alloy when hot pressed.

* * * * *